United States Patent
Bottoms

[11] 3,898,025
[45] Aug. 5, 1975

[54] RING GEAR ELEMENTS FOR GEAR PUMPS

[75] Inventor: Harry Simister Bottoms, Solihull, England

[73] Assignee: Joseph Lucas (Industries) Limited, London, England

[22] Filed: Mar. 18, 1974

[21] Appl. No.: 452,462

[30] Foreign Application Priority Data
May 10, 1973 United Kingdom............ 22304/73

[52] U.S. Cl. ............... 418/170; 418/190; 74/457; 74/462
[51] Int. Cl.² ........................................ F04C 1/12
[58] Field of Search ...... 418/189, 190, 170; 74/462, 74/467, 468, 437, 457

[56] References Cited
UNITED STATES PATENTS

| | | | |
|---|---|---|---|
| 1,311,943 | 8/1919 | Andrews | 74/457 |
| 2,051,914 | 8/1936 | Suenson | 74/462 |
| 2,138,490 | 11/1938 | Habber | 74/462 |
| 2,433,360 | 12/1947 | Haight | 418/170 |
| 3,491,698 | 1/1970 | Truinger | 418/190 |

Primary Examiner—C. J. Husar
Attorney, Agent, or Firm—Holman & Stern

[57] ABSTRACT

In a gear pump or motor of the kind in which a pinion meshes with an internally-toothed ring gear, the ring gear is provided with grooves at the radially outer ends of the spaces between the gear teeth. The grooves are provided with surfaces which are radially outwardly inclined, so that dirt accumulating between the teeth is urged out of the grooves by centrifugal action. The inlet and outlet passages are enlarged so as to extend across the grooves.

4 Claims, 3 Drawing Figures

RING GEAR ELEMENTS FOR GEAR PUMPS

This invention relates to gear pumps and motors of the kind having a housing, an internally-toothed ring gear mounted for rotation within the housing, a pinion meshing with the ring gear and mounted for rotation about an axis parallel to and spaced from the ring gear axis, and inlet and outlet passages in the housing on opposite sides of the zone where said ring gear and said pinion are in mesh.

In the pumps and motors of the foregoing kind dirt frequently becomes lodged in the recesses which define the teeth of the ring gear, being urged into these recesses by centrifugal action of the working fluid within the pump or motor. It has been proposed to provide chamfers on the flanks of the teeth, either of the pinion or the ring gear, to assist in ejection of dirt. These chamfers, however cause a reduction in the areas of engagement between the meshed teeth, and hence a reduction in sealing between the meshing gears and a loss of efficiency in the pump or motor.

It is an object of the invention to provide a pump or motor in which the aforesaid accumulation of dirt is reduced, substantially without reduction in efficiency.

According to the invention a pump or motor of the kind specified has a ring gear which is provided with grooves at the radially outer ends of the recesses which define the gear teeth, each said groove having a surface which lies in a plane passing through the axis of the ring gear and is inclined to the axis of the ring gear whereby, in use, fluid within said grooves is urged by centrifugal action in directions generally axially of the ring gear.

An example of the invention will now be described with reference to the accompanying drawings, in which.

Figure 1:
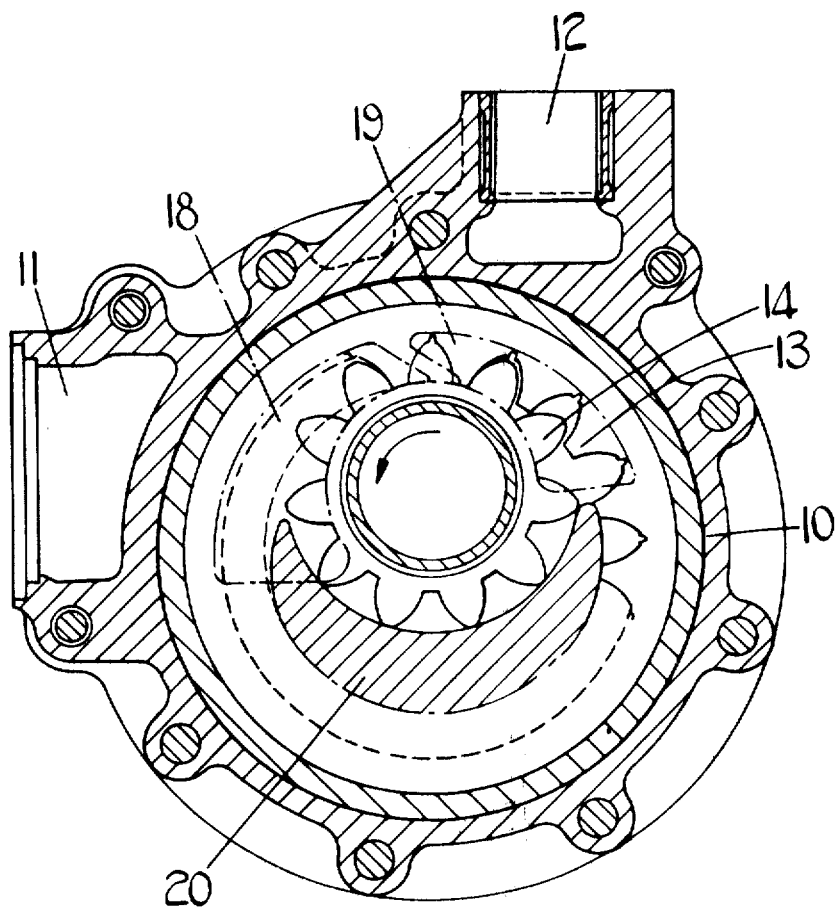
FIG. 1 is a section through an internally-meshing gear pump.
Figure 2:
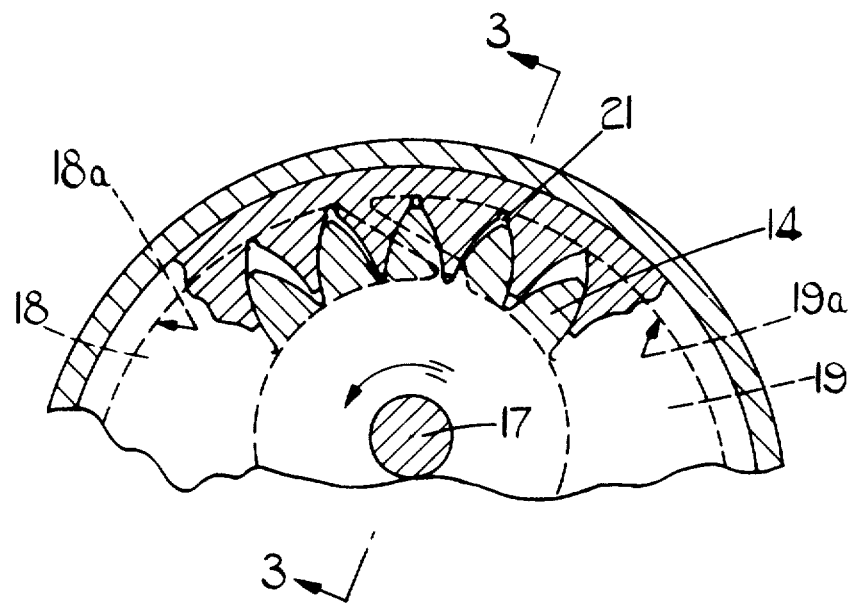
FIG. 2 shows, somewhat diagrammatically and to a larger scale, a part of FIG. 1.
Figure 3:
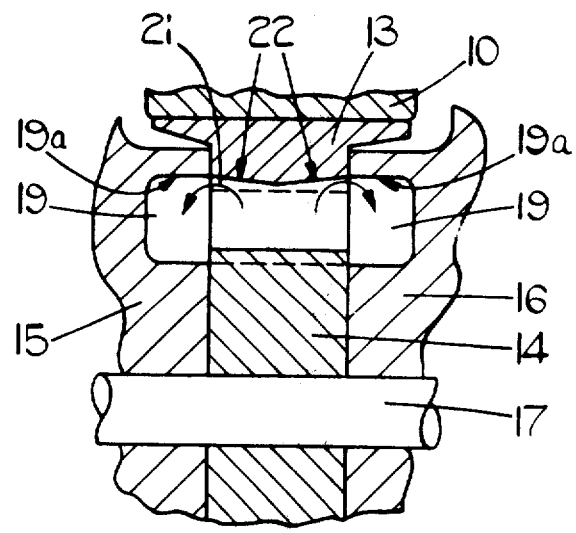
FIG. 3 is a section on line 3—3 in FIG. 2.

As shown in FIG. 1 a pump has a housing 10 provided with a low-pressure inlet 11 and a high-pressure outlet 12. Within the housing 10 an internally-toothed ring gear 13 is mounted for rotation about its axis. A pinion 14 meshes with the ring gear 13 and is mounted for rotation about an axis spaced from, and parallel to, the axis of rotation of ring gear 13. Ring gear 13 and pinion 14 have the same axial dimensions and are sealingly engaged by side plates 15, 16. The pinion 14 is secured to a shaft 17 which extends through the side plates 15, 16 and externally of the housing 10 to provide a driving connection for the pump.

In the plates 15, 16 are passages 18 which communicate with inlet 11, and passages 19 which communicate with outlet 12. A crescent shaped member 20 is secured to the housing 10 so as to lie between the teeth of gear 13 and pinion 14 where these are not in mesh. The internal profile of member 20 is an arc centred on the axis of shaft 17 and the external profile is an arc centred on the axis of ring gear 13. The internal and external profiles are respectively wiped by the crests of the teeth of pinion 14 and gear 13.

The outer ends of the recesses which define the teeth of gear 13 are formed with grooves 21 which extend through the thickness of gear 13. The grooves 21 have two surfaces 22 which lie, as shown, in planes which pass through the axis of gear 13, which are inclined to the gear axis and which slope radially outward from the median plane of the gear 13. The passages 18, 19 are dimensioned so that their radially outer walls 18a, 19a are aligned with the outer ends of surfaces 22.

In use the pump operates in a known manner to draw fluid from the inlet 11 and to discharge it from the outlet 12.

Since any dirt in the recesses of the ring gear 13 is more dense than the pumped fluid, this dirt is separated by centrifugal action to enter the grooves 21. Dirt within grooves 21 is urged generally axially of the ring gear 13 by the surfaces 22.

When the grooves 21 are in communication with the outlet passage 19 centrifugal action causes a part of the pumped fluid to be urged into the grooves 21 before passing into the passage 19. This part of the fluid thus provides a scouring action which ensures that dirt does not lodge in the grooves 21 to build up in the recesses of the ring gear.

Moreover, the increase in the radial dimensions of the inlet and outlet passages 18, 19 has the effect that their flow area is increased, so that passage of liquid to and from the spaces between the teeth of gear 13 is facilitated.

I claim:

1. A gear pump or motor having a housing, and internally-toothed ring gear mounted for rotation within the housing, a pinion meshing with the ring gear and mounted for rotation about an axial parallel to and spaced from the ring gear axis, and inlet and outlet passages in the housing on opposite sides of the zone where said ring gear and said pinion are in mesh, the ring gear being provided with grooves at the radially outer ends of the recesses which define the gear teeth, a part of the surface of each said groove lying in a plane which passes through the axis of the ring gear, said surface part being radially outwardly inclined to the axis of the ring gear whereby, in use, fluid within said grooves is urged by centrifugal action in directions generally axially of the ring gear.

2. A pump or motor as claimed in claim 1 in which said inlet and outlet passages have dimensions, radially of the ring gear, such that the radially outer walls of the passages are substantially aligned with the axial ends of said grooves.

3. A gear pump or motor having a housing, an internally-toothed ring gear mounted for rotation within the housing, a pinion meshing with the ring gear and mounted for rotation about an axis parallel to to and spaced from the ring gear axis, and inlet and outlet passages in the housing on opposite sides of the zone where said ring gear and said pinion are in mesh, the ring gear being provided with grooves at the radially outer ends of the recesses which define the gear teeth, each said groove having two surfaces which lie in a plane which passes through the axis of the ring gear and said surfaces being radially outwardly inclined to the ring gear axis, said surfaces extending in opposite directions from a point intermediate the axial end faces of the ring gear.

4. A pump or motor as claimed in claim 3 in which said surfaces extend in opposite directions from a point on the median plane of the ring gear.

* * * * *